United States Patent [19]

Feher

[11] Patent Number: 5,002,336
[45] Date of Patent: Mar. 26, 1991

[54] SELECTIVELY COOLED OR HEATED SEAT AND BACKREST CONSTRUCTION

[76] Inventor: Steve Feher, 1909 Aleo Pl., Honolulu, Hi. 96822

[21] Appl. No.: 423,008

[22] Filed: Oct. 18, 1989

[51] Int. Cl.$^5$ ............................................. A47C 7/72
[52] U.S. Cl. ...................................... 297/180; 5/461; 5/469
[58] Field of Search ................. 297/180; 5/284, 461, 5/469

[56] References Cited

U.S. PATENT DOCUMENTS

| | | | |
|---|---|---|---|
| 2,722,266 | 11/1955 | Kersten | 297/180 |
| 3,266,064 | 8/1966 | Figman | 5/469 |
| 3,644,950 | 2/1972 | Lindsay, Jr. | 5/469 |
| 4,563,387 | 1/1986 | Takagi et al. | 5/461 |
| 4,712,832 | 12/1987 | Antolini et al. | 5/461 |

Primary Examiner—Peter A. Aschenbrenner
Attorney, Agent, or Firm—George J. Netter

[57] ABSTRACT

A seating construction with joined seat and backrest parts has a plenum into which is received temperature conditioned air. Coil springs define the plenum and a covering is secured over the springs consisting of, from the inside out, a metal mesh layer, an elastomer sheet with a number of openings, and an air permeable fabric layer. The elastomer sheet behaves as a viscous liquid when subjected to forces and shocks. An alternative to the elastomer sheet is a baglike layer filled with fluid with a number of openings provided to enable passage of conditioned air through the layer.

21 Claims, 5 Drawing Sheets

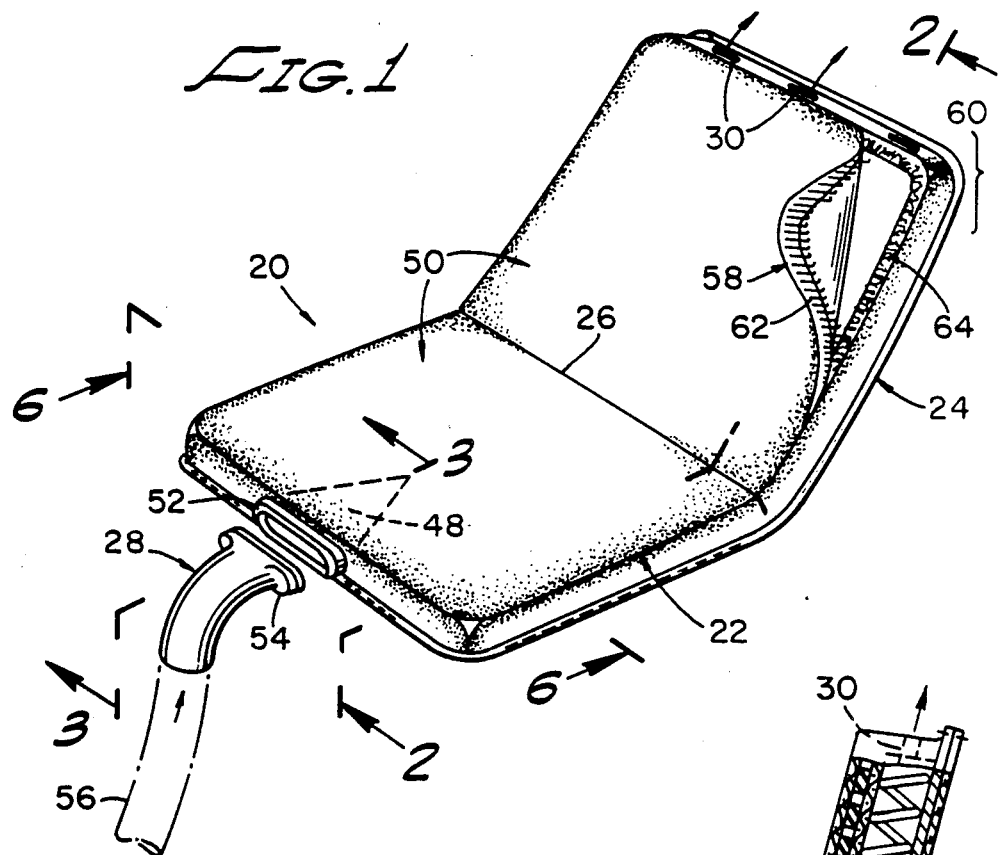
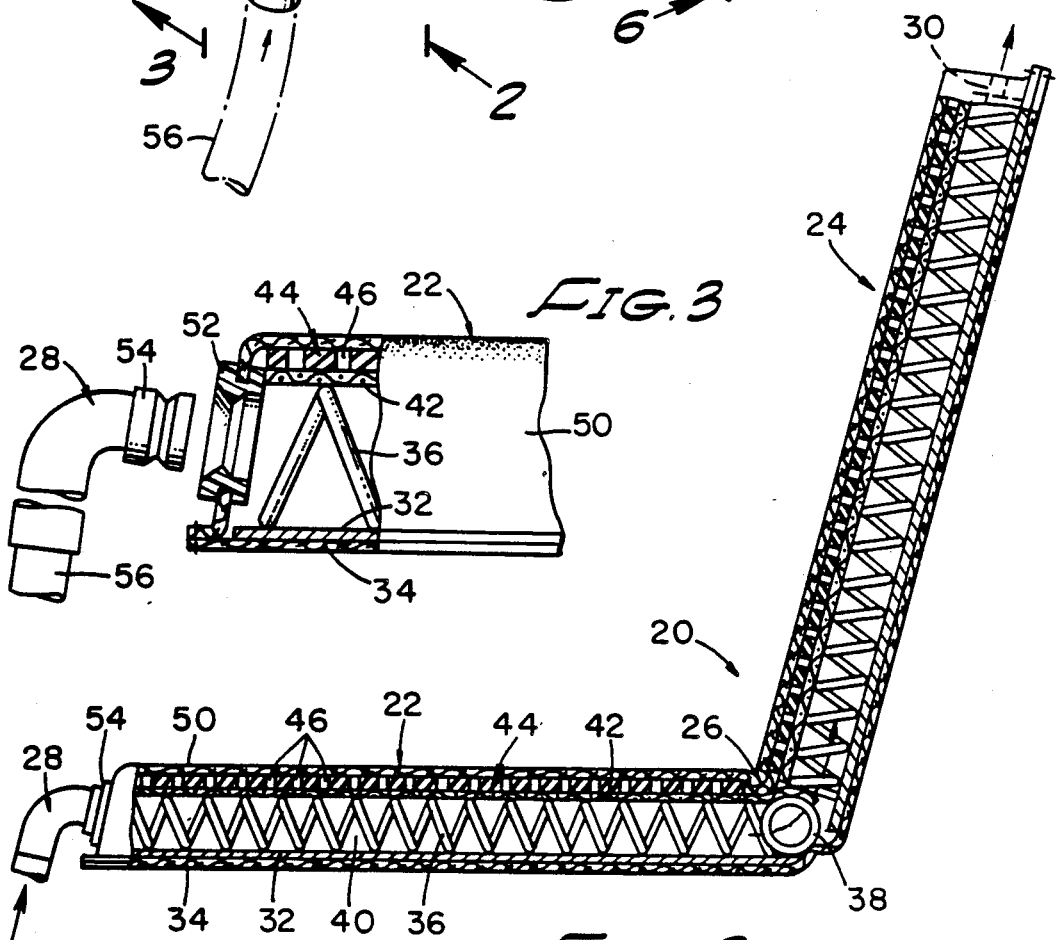

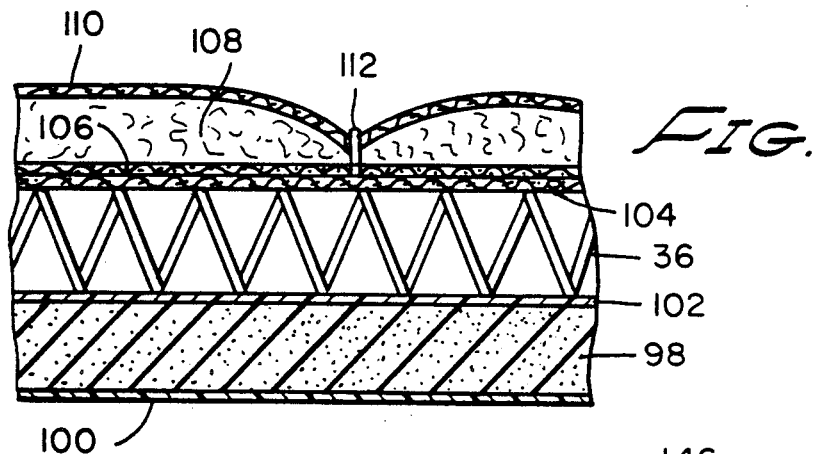
FIG. 11
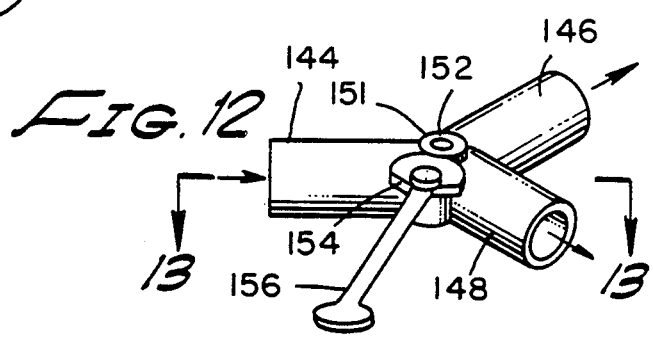
FIG. 12
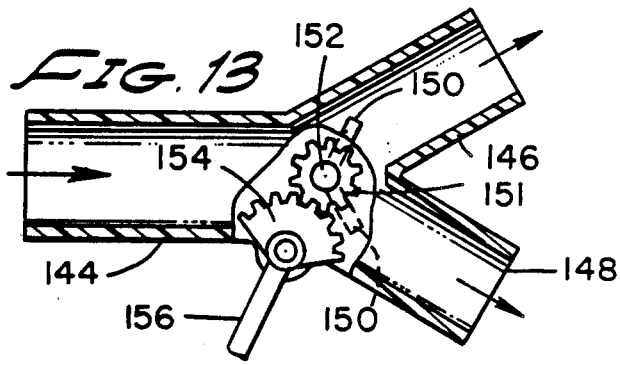
FIG. 13
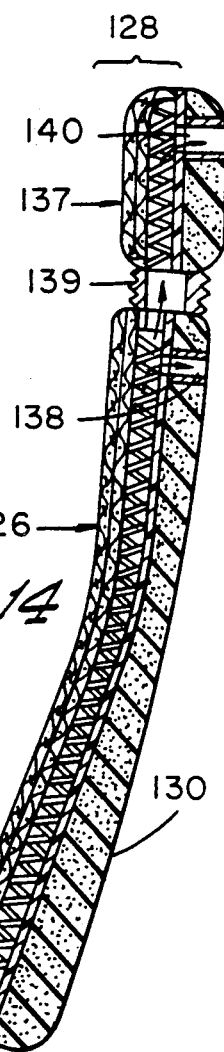
FIG. 14
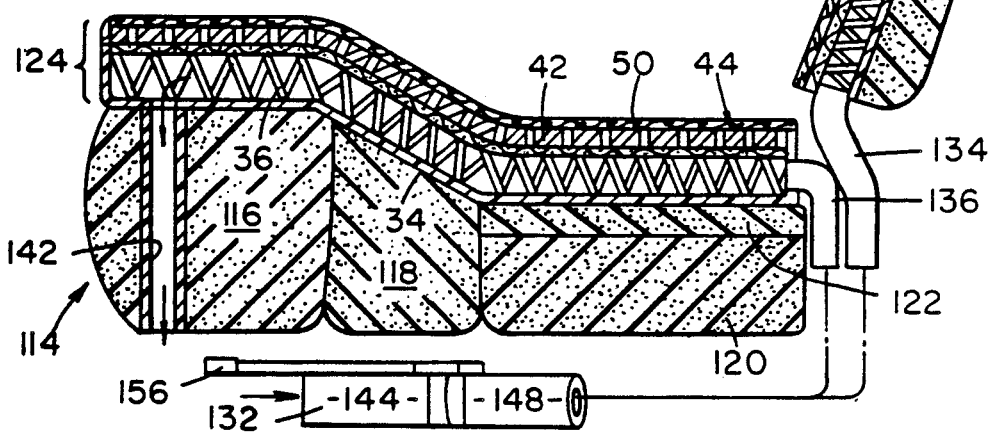

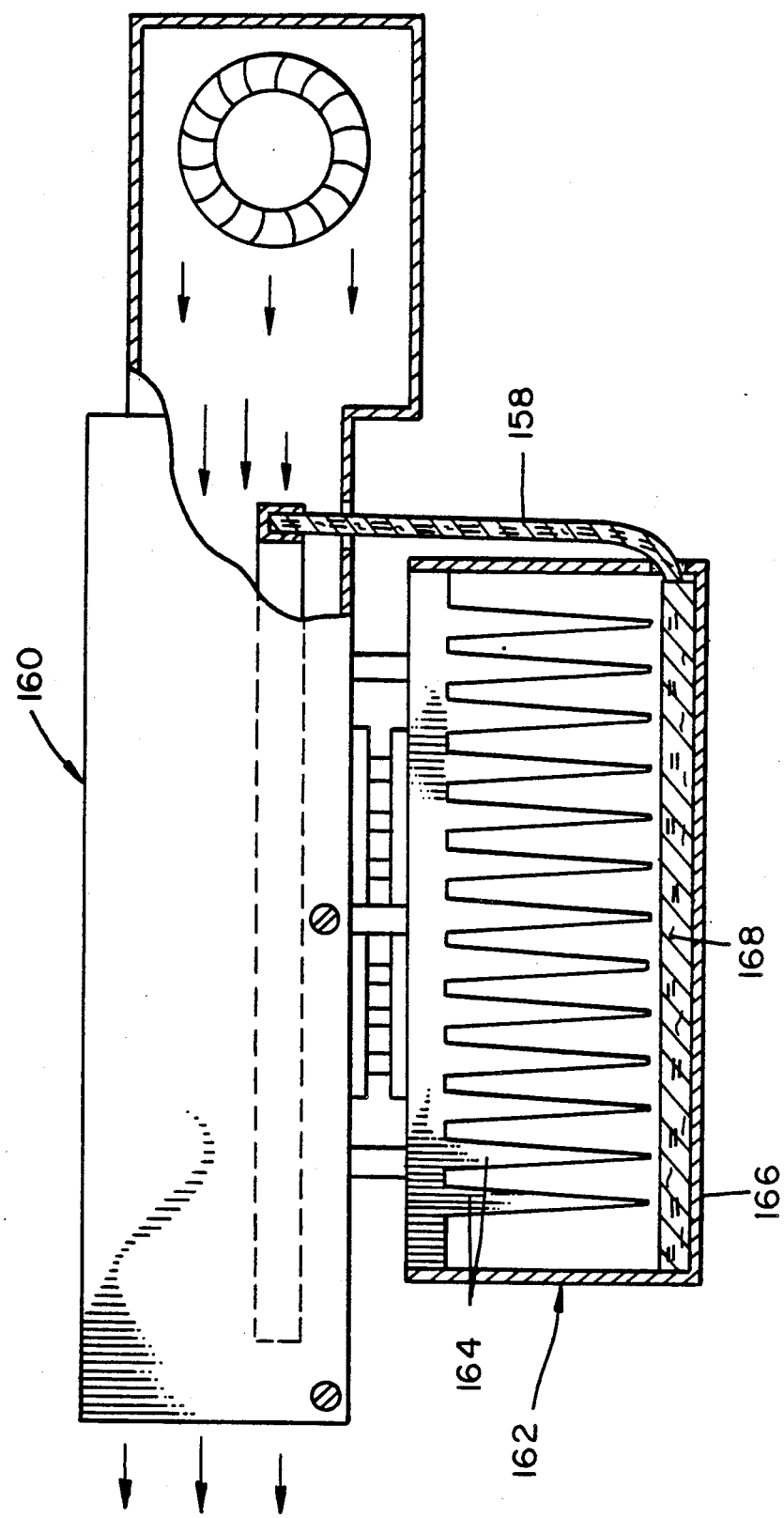

5,002,336

SELECTIVELY COOLED OR HEATED SEAT AND BACKREST CONSTRUCTION

FIELD OF THE INVENTION

The present invention relates generally to a seat and backrest construction, and, more particularly, to such a seat and backrest construction provided with temperature conditioned air for selectively cooling or warming the user, as desired.

BACKGROUND OF THE INVENTION

In co-pending U.S. patent application Ser. No. 07/272,518, COOLING AND HEATING SEAT PAD, filed Nov. 17, 1988 by Steve Feher there is described a seat pad construction which can be located on a preexisting seat, or consolidated integrally into a seat, which has an internal plenum supplied with air from a Peltier powered unit that can be cooled or heated, as desired. Although the described device functions adequately for the desired purpose of cooling and heating, in order to achieve optimal operation it was thought necessary that comfort would have to be sacrificed. Also, under certain conditions excessive accumulation of condensate was found to occur with the potential of spilling and damaging vicinity of use.

SUMMARY OF THE INVENTION

In accordance with the present invention there is provided a seat and backrest construction enclosing a plenum into which temperature conditioned air passes generated by a Peltier or other thermoelectric device located under the seat or otherwise conveniently situated. In accordance with a first version, the covering on the outer surface facing the user is multi-layered consisting of, from the inside out, a metal and/or plastic mesh layer, a sheet of a synthetic elastomer or natural rubber material having a plurality of openings formed therethrough which material has the special properties of being able to provide exceptional dissipation of forces, shocks and vibrations normally encountered in a moving automotive vehicle, and an outer diffusion cover layer constructed of any suitably permeable fabric material or perforated leather. It is contemplated that the diffusion layer be releasably secured to the seat and backrest by a hook and loop connector, for example, so that on becoming damaged or worn it can be replaced instead of having to replace the entire unit. The material forming the perforated sheet has such load distribution, shock and vibration absorption properties as to enable using a relatively thin sheet that will readily allow thermal transfer via convection primarily, and, to a lesser extent, by conduction.

The internal plenum of both the seat and backrest is formed by a plurality of metal wire helically wound springs, oval in cross-section, which are closely spaced presenting a resilient supporting force to transversely applied forces. These springs maintain the plenum for temperature conditioned air even when subjected to the weight of the user sitting or leaning against them.

An alternative embodiment of the invention contemplates replacing the oval metal wire springs with a plurality of molded, flexible plastic tubes having perforated walls which provide sufficient rigidity to maintain the plenum for the temperature conditioned air and also sufficiently flexible to form a comfortable seat and backrest while promoting thermal transfer via convection between the warm air at the surface of the user's body and clothing and the cool de-humidified air flowing past the user on the inside of the plenum when in the cooling mode. Heat transfer direction is reversed in the heating mode.

In yet another version, the seat and backrest portions are incorporated into an integral seat arrangement with conditioned air being supplied separately in prorated amounts. The seat part includes a lower base of multi-density foam over which a suspension of plenum coils of either the metal wire kind or the hollow plastic tubes is located. A layer of copper or aluminum cloth is positioned over the suspension coils and a layer of a more open plastic mesh is covered by a force absorbing and distributing perforated elastomer layer and outer convection diffusion layer. The conditioned air is added to the enclosed plena of both the seat and backrest. There not only is added comfort from the multi-density foam, but the metal and plastic mesh serves to distribute the user's weight uniformly over the seat and backrest surface while allowing convection and conduction thermal transfer to occur efficiently.

As yet another alternative, instead of the perforated elastomer layer, a pad is constructed of a pair of plastic sheets arranged in facing relationship and heat sealed at a number of points to provide a number of openings while preventing fluid leakage out of the bag. The enclosed bag is filled with a so-called Flourinert liquid which possesses high thermal transfer properties. Also, at the sealed points the openings formed allow thermal transfer to occur via air convection between the user and the hot (cold) air within the plena.

To reduce condensate collection in the conditioning unit, a felt strip has one end in contact with a felt pad in the main exchanger cover which then becomes a condensate trap, and the opposite is positioned within the air stream at the auxiliary changer. Acting as a wick the felt moves the condensate liquid by capillary force into the air stream which takes it away preventing undue liquid accumulation within the main exchanger housing which is undesirable since excessive condensate accumulation reduces main exchanger performance.

DESCRIPTION OF THE DRAWING

FIG. 1 is a perspective view of the seat and backrest of the present invention;

FIG. 2 is a side elevational, sectional view taken along the line 2—2 of FIG. 1;

FIG. 3 is a partially fragmentary sectional view taken through the conditioned air entrance point along line 3—3 of FIG. 1;

FIG. 11 is a sectional, elevational view of an alternate form of seat and backrest construction showing additional padding;

FIG. 12 is a three way valve for use in directing proportioned amounts of air to the seat and backrest;

FIG. 13 is a sectional, elevational view taken along the line 13—13 of FIG. 1;

FIG. 14 is a side elevational sectional view of a two-piece embodiment of the present invention; and FIG. 15 is a sectional view of an improved condensate trap.

DESCRIPTION OF PREFERRED EMBODIMENTS

Figure 4:
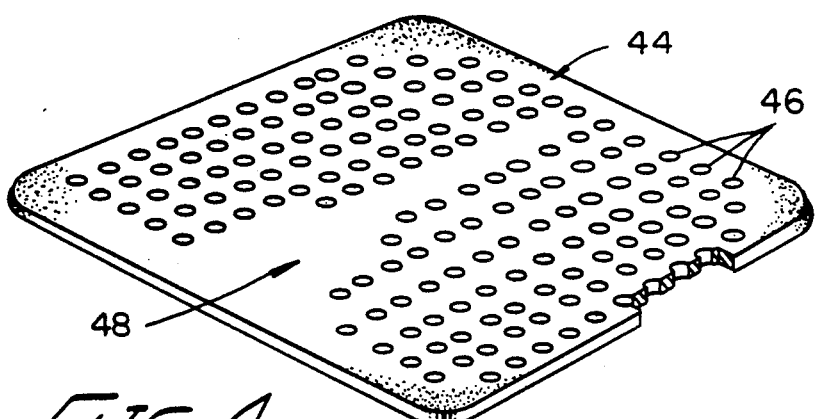
FIG. 4 is a perspective, partially sectional view of a force absorbing and heat transfer sheet of the present invention.

Turning now to the drawings and particularly FIG. 1 there is shown a seat and backrest construction in accordance with the present invention identified generally as 20. More particularly, the construction 20 includes generally a seat 22 and backrest 24 joined along a fold line 26. As will be shown, the interior of the seat and backrest forms a single intercommunicating air plenum through which pressurized conditioned air entering from a conduit 28 passes and finally leaves the backrest at exit points 30. As will be clarified later herein, the primary mode of operation is to take the cooling or warming effect of the conditioned air which passes through the plenum and spread it out over the entire back surface and seat surface for achieving a corresponding warming/cooling of the user. A preferable air conditioning unit is the Peltier powered unit described in the referenced Feher patent application.

For the ensuing description of the details of the seat and backrest 20, reference is now made simultaneously to FIGS. 2 through 4 and 6. Since the seat and backrest construction is substantially the same for both, only the seat will be fully described with differences of the backrest noted later. The seat 22 includes a flexible and imperforate lower sheet 32 over which a fabric, or other generally aesthetically pleasing outer surface covering 34 may be formed. Since the cooling/heating effect is not required on the seat lowermost and backrest outer surfaces, the sheet 32 and covering 34 should be impervious to air passage and preferably be a relatively poor heat conductor.

Figure 6:
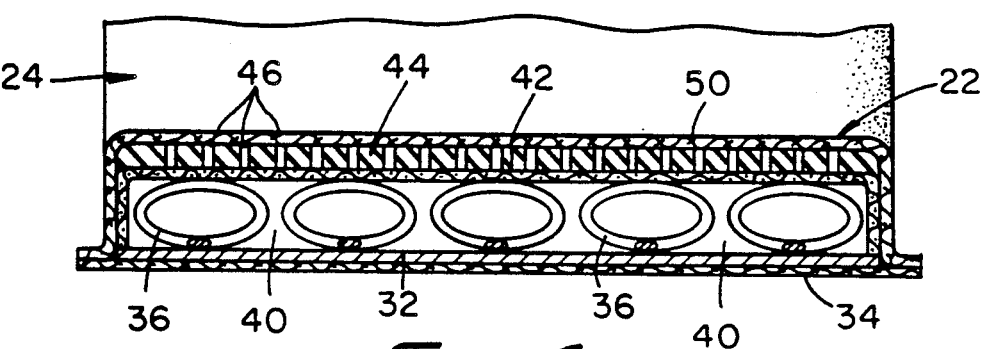
FIG. 6 is an end elevational, sectional view taken along line 6—6 of FIG. 1.

The essential support for the seat includes a plurality of metal wire spring coils 36 which have been flattened somewhat in their cross-section (FIG. 6) so that they appear oval. Accordingly, as shown in FIG. 6 a plurality of these coils are located closely adjacent to one another and rest on the upper surface of the flexible sheet 32 with their broader cross-sectional dimension maintained parallel to the sheet 32. Along the juncture between the backrest and the seat (sometimes referred to as the "bite line"), there is a single coil 38 to define the hinge between the seat and backrest (portable folding cushion and/or one-piece bucket type seats) and allow free internal air flow through the bite line, or hinge line area, by preventing collapse. The springs collectively maintain an air plenum 40 throughout the seat, and the backrest as well.

A metal and/or plastic mesh layer 42 completely covers the upper surface of the coils 36 and 38. Outwardly or above the mesh layer 42 is a sheet 44 of an elastomer having exceptional force, vibration and shock absorbing properties and including a plurality of openings 46 extending completely the material (FIG. 4) while leaving a portion 48 towards the front edge center devoid of openings which would normally be located between the legs of a user of the device. The corresponding sheet 44 for the backrest does not have anything similar to portion 48, but instead has openings uniformly existing over the entire sheet.

A preferred and advantageous form of the layer 42 is obtained by using a first layer of copper or aluminum cloth of approximately 80×80 mesh and wire diameter of approximately 0.005 inches, over which is laid a layer of a plastic mesh (approximately 9×9) of 0.015–0.020 inches filament diameter.

The material best utilized for making a sheet 44 is sold under the trade designation Sorbothane which has the useful physical properties of behaving as a viscous fluid when subjected to force, shock, or vibration. The plastic acts to absorb the "feel" of the coils and yet can be made thin enough so as not to impede ready heat transfer. In addition, the openings in the elastomer sheet 44 allow convection to take place so that the use will experience cooling and dehumidification or warming, depending upon which mode of use is chosen.

An uppermost layer 50 made of any air permeable fabric or other suitable convection diffusion material, including perforated leather, covers the elastomer sheet 44. The front or leading edge portion of the seat includes a fitting 52 into which a complementary fitting 54 can be releasably snapped, the latter being received on the end of a conduit 56 which interconnects with a supply of pressurized conditioned air.

Returning to FIG. 1, there is a turned back portion 58 of the diffusion layer 50 showing a preferred manner of releasably affixing the diffusion layer via a hook and loop connector (Velcro) 60. More particularly, the hook part 62 is secured to the border of the diffusion layer and the loop part 64 is secured to the edge portion of the plate 32. In this manner, a diffusion layer may be readily replaced individually rather than requiring replacement of the entire seat and backrest.

Figure 7:
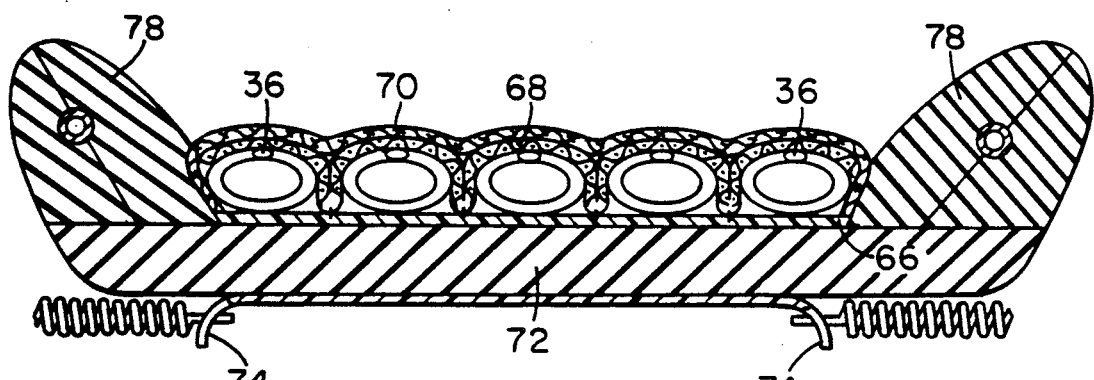
FIG. 7 is an end elevational, sectional view similar to FIG. 6 of a further embodiment of the present invention.

FIG. 7 depicts an alternate embodiment of seat construction which is substantially more comfortable than the first described version. Specifically, a lower support sheet 66 receives a plurality of spring coils, or perforate plastic tubes 92 which can be identical to the coils 36 of FIG. 2. The spring coils are arranged in parallel side-by-side relation and over which a plastic mesh or wire mesh layer 68 is received and stapled or otherwise secured to the underlying plate 66 in between each of the coils thereby serving to firmly position the springs in place. An outer diffusion layer 70 is then formed over the entire assembly and can include ornamentation, as desired. The entire seat assembly is located on foam pad 72 which, in turn, is positioned on a plurality of transversely extending straps 74 that are spring-loaded at their edges for resiliency and comfort, as well as support. Bolsters 78 can be added at each side to position the body over the coils 36.

Figure 8:
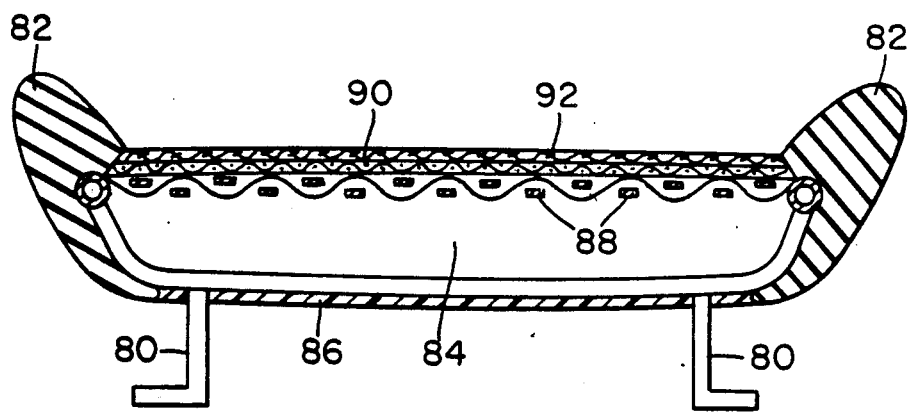
FIG. 8 is a view similar to FIG. 7 of a still further embodiment of the present invention.

A still further form of the invention is that shown in FIG. 8 in which a main feature is the elimination of the spring coils 36. In particular, the seat assembly is shown mounted on brackets 80 arranged on the bottom adjacent each side, and, as in the FIG. 7 embodiment, includes bolsters 82 at each side. A hollow plenum 84 is defined by an interconnected sidewall and bottom wall shell 86 made of molded vinyl, for example, over the top of which a plurality of flexible plastic straps 88 woven in tension define an upper surface for the plenum and through which convection can readily occur. Over the plastic straps there is located first a plastic/metal mesh 90 and finally a diffusion layer 92.

Figure 9:
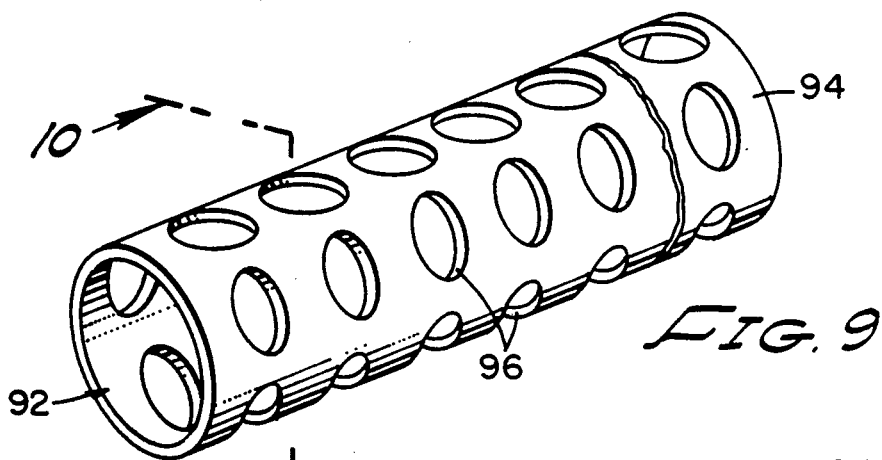
FIG. 9 is an enlarged, perspective view of a alternate suspension coil of the invention.
Figure 10:
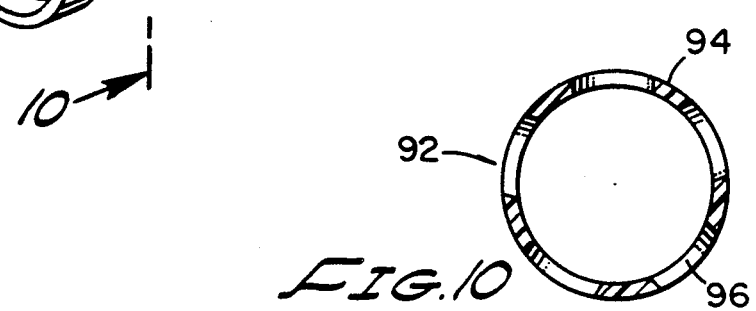
FIG. 10 is an end elevational, sectional view taken along the line 10—10 of FIG. 9.

Turning now to FIGS. 9 and 10 there is shown a substitute resilient support for the spring coils 36 of the earlier described embodiments. As shown there, each spring element 92, which dimensionally can be substantially identical to a coil 36 previously described, consists of a hollow cylindrical body 94 constructed of molded plastic or extruded plastic having a plurality of openings 96 distributed over its surface. This member not only possesses a suitable springlike flexibility for forces directed transversely of its longitudinal dimensions, but also the air can readily pass along the central bore as well as through the openings in its side wall. These coils can be used wherever the coil springs are used in a seat or backrest of the described embodiments.

FIG. 11 shows in section a further form of seat (and backrest) in which a foam layer 98 is laid down on a rigid sheet 100 and covered by a similar flexible sheet 102 to form a base for spring coils 36 (or, optionally, spring element 92). A plastic mesh layer 104 is then laid down on the coils, and over which a metal mesh layer 106 is applied followed by a highly air-permeable, nonwoven nylon, dacron, or the like, layer, such as batting 108. Finally, a suitable diffusion layer 110 covers the assembly and can be secured to 106 by conventional stitching 112.

FIG. 14 shows in elevation yet another version of seat and backrest construction of this invention especially adapted for permanent mounting in a vehicle. The lower part of the seat 114 is formed from a number of different members 116, 118, 120 and 122 constructed of different density foam which provides more supporting strength where needed in the buttock region and a more resilient response round the legs and thighs. The upper part of the seat identified as 124 can be identical to that depicted in FIG. 2, numerals 32–50. The backrest 126 has a front part 128 which can be identical to 124, and a foam layer 130 applied to the outer rear surface. Incoming conditioned air (arrow) passes through a two-way proportioning valve 132 to be described which provides air separately to the backrest 126 via an entrance conduit 134, and to the seat 114 via conduit 136. Air exits to the rear via ducts 138 and 140, and under the seat via duct 142.

Headrest 137 can be constructed similarly to backrest 126 and is interconnected therewith by a flexible tube 139 via which conditioned air is received. Accordingly, the headrest is not only conditioned for temperature, but also is more comfortable as a result of the flexibility of 139.

FIGS. 12 and 13 depict the two-way valve consisting of an air inlet tube 144 having two outlets, one (146) for directing air to the seat, and the other (148) for directing air to the backrest. A valve flap 150 is located within the valve and rotatably mounted for adjustment from one extreme completely closing off 146 and leaving 148 open, to a further extreme with 148 closed and 146 open. Adjustments in between the two extremes will provide a proportionate amount of conditioned air to the seat and backrest. A gear 150 affixed to the outer end of shaft 152 which passes through the flap valve, meshes with a further gear 154 affixed to the end of a lever adjustment arm 156. Preferably, the valve is located underneath the seat and affixed either to the floor or the bottom of the seat, as desired.

A continuing problem is the matter of condensate accumulation in the air conditioning unit and its disposal. It is desirable not to have to be emptying condensate on a regular basis or providing a drain for the liquid. That is, there would be not only the inconvenience, but also the possibility of spilling the water onto the floor or onto the seat itself in attempting to remove it. Also, the use of pipes or conduits from a seat location in an automotive vehicle is not convenient, although it is possible that an opening could be formed in the auto floor for this purpose. However, in the latter case some conditioned air would leak out and dirt could plug the opening resulting in main exchanger condensate flooding.

As shown in FIG. 15, the condensate problem is obviated by locating one end of a wide strip of felt 158 in the exit air stream of the auxiliary exchanger 160 for the air conditioner, which is above ambient temperature when the heat pump is in cooling mode. A part of such apparatus enumerated 162 includes a plurality of heat exchanging fins 164 located within the main exchanger housing 166. The lower end of the felt strip is located in the bottom of the main exchanger housing and interconnects with a felt pad 168 that covers the entire bottom of the exchanger housing so as to be wetted by condensate. The condensate liquid (not shown) moves along the felt strip by capillary action out of the housing 166 into the air stream (arrows) where it is evaporated relatively rapidly and carried away into the ambient atmosphere. The efficiency of auxiliary exchanger 160 is enhanced by the evaporative cooling of the condensate evaporating from the wick in the auxiliary exchanger cooling air stream.

Figure 5A:
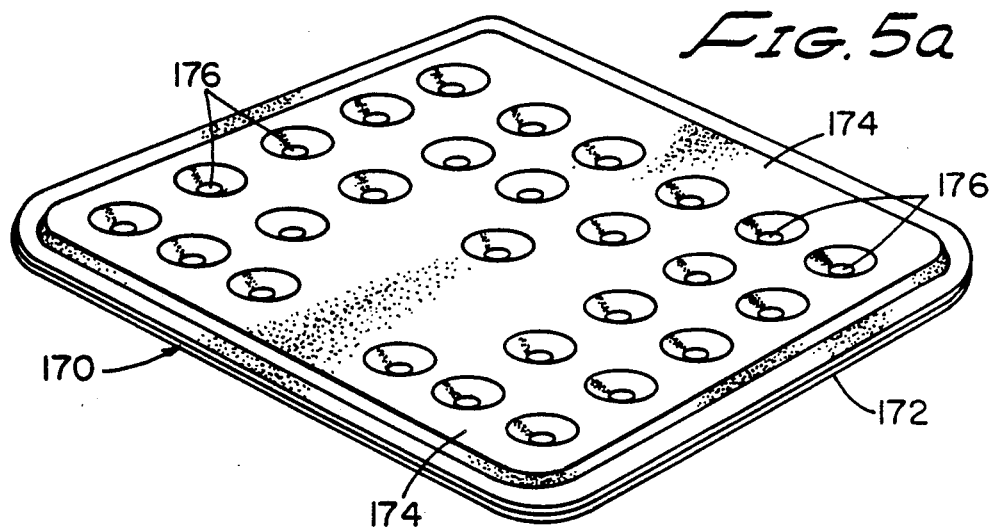
FIGS. 5a and 5b show perspective and sectional views of an alternative form of force absorbing and heat transferring sheet.
Figure 5B:
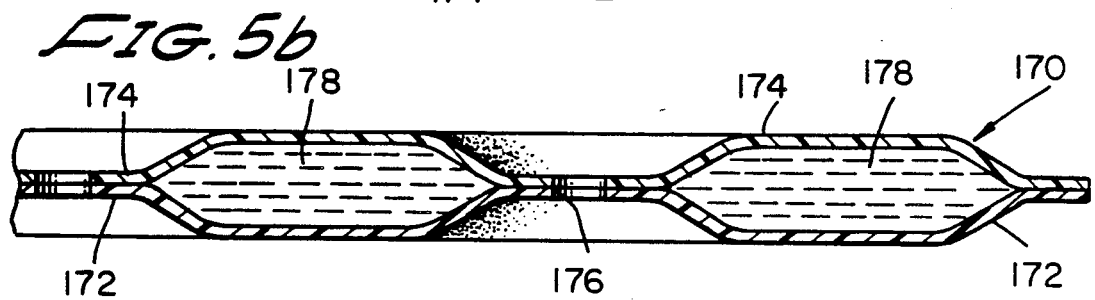

FIGS. 5a and 5b show an alternative form of shock absorbing and heat transferring barrier 168 that can be substituted for the elastomer sheet 44 (FIG. 2). It consists of a pair of flexible plastic sheets 172 and 174 that are sealed at their outer margins and at a number of other uniformly distributed points through each of which sealed points an opening 176 is formed. The total area of the holes should result in a net open area of between 35–45 percent of the seat pad surface. A liquid 178 having a high convection thermal transfer coefficient, such as the liquid Flourinert manufactured by the 3M Company, is inserted into the bag formed by the sheets 172 and 174. When the barrier is used in, say, the FIG. 2 embodiment, the liquid filled portion of the bag provides both resilience and uniform temperature distribution. The openings also aid in promoting air convection cooling (or heating) of the user. By using a filler fluid with high liquid convection thermal transfer plus holes which allow air or gas convection to occur, the total thermal transfer efficiency is enhanced.

What is claimed is:

1. A seating construction having joined seat and backrest parts enclosing a common plenum for receiving temperature conditioned air therein, comprising:
   spring means within the common plenum; and
   a covering secured over the coil springs including, from the springs outward,
   a metal mesh layer,
   an elastomer sheet having a plurality of openings extending therethrough, an air permeable fabric layer.

2. A seating construction as in claim 1, in which the elastomer sheet is constructed of a synthetic plastic which behaves as a viscous fluid when subjected to force, shocks and vibrations normally encountered in an automotive vehicle.

3. A seating construction as in claim 1, in which the elastomer sheet is constructed of natural rubber.

4. A seating construction as in claim 2, in which the elastomer sheet is approximately 0.1875 inches in thickness.

5. A seating construction as in claim 1, in which the spring means consists of a plurality of coil springs arranged to receive forces applied to the seating construction along directions generally parallel to the planes of the coil springs.

6. A seating construction as in claim 1, in which the spring means consists of a plurality of hollow tubular molded synthetic plastic elements the walls of which contain openings, and the synthetic plastic being flexible.

7. A seating construction as in claim 1, in which the conditioned air is provided by a thermoelectric unit having a condensate trap including a housing, a felt pad within the housing in contact with condensate, and a felt wick having one end in contact with the pad and the other end located outwardly of the housing.

8. A seating construction comprising:
a seat includes,
  a base formed from a plurality of foam members, at least two of which have foam of different densities,
  spring means resting on the base, metal mesh secured over the spring means,
  an elastomer sheet on the metal mesh having a plurality of openings extending therethrough,
  an outer air permeable material over the elastomer sheet,
  a conditioned air entrance conduit for directing conditioned air through the spring means,
a backrest includes,
  a foam base,
  spring means,
  metal mesh covering the spring means,
  an elastomer sheet over the metal mesh,
  a conditioned air entrance conduit for directing air through the spring means;
  a headrest having a hollow interior and a flexible connection hose interconnecting the headrest interior with the backrest spring means;
  a thermoelectric air conditioning unit having an ambient air input and a conditioned air output; and
  a proportioning valve interconnecting the air conditioning unit output and the entrance conduits for the seat and backrest.

9. A seating construction as in claim 8, in which the elastomer sheet is constructed of a synthetic plastic which behaves as a viscous fluid when subjected to force, shocks and vibrations normally encountered in an automotive vehicle.

10. A seating construction as in claim 8, in which the elastomer sheet is constructed of natural rubber.

11. A seating construction as in claim 10, in which the elastomer sheet is approximately 0.1875 inches in thickness.

12. A seating construction as in claim 8, in which the spring means consists of a plurality of coil springs arranged to receive forces applied to the seating construction along directions generally parallel to the planes of the coil springs.

13. A seating construction as in claim 8, in which the spring means consists of a plurality of hollow tubular molded synthetic plastic elements the walls of which contain openings, and the synthetic plastic being flexible.

14. a seating construction having joined seat and backrest parts enclosing a common plenum for receiving temperature conditioned air therein, comprising:
  spring means within the common plenum; and
  a covering secured over the spring means including, from the spring means outward,
    a metal mesh layer,
    a baglike layer consisting of a pair of flexible sheets sealed together about their edges and at a plurality of spaced apart points forming an enclosed chamber, liquid within the chamber, and openings formed in the sealed spaced apart points.

15. A seating construction as in claim 14, in which the liquid has a high convection thermal transfer coefficient.

16. A seating construction as in claim 14, in which the spring means consists of a plurality of coil springs arranged to receive forces applied to the seating construction along directions generally parallel to the planes of the coil springs.

17. A seating construction as in claim 14, in which the spring means consists of a plurality of hollow tubular molded synthetic plastic elements the walls of which contain openings, and the synthetic plastic being flexible.

18. A seating construction as in claim 14, in which the conditioned air is provided by a thermoelectric unit having a condensate trap including a housing, a felt pad within the housing in contact with condensate, and a felt wick having one end in contact with the pad and the other end located outwardly of the housing.

19. A seating construction comprising:
a seat includes,
  a base formed from a plurality of foam members, at least two of which have foam of different densities, spring means resting on the base, metal mesh secured over the spring means,
  a baglike layer consisting of a pair of flexible sheets sealed together about their edges and at a plurality of spaced apart points forming an enclosed chamber, liquid within the chamber, and openings formed in the sealed spaced apart points,
  an outer air permeable material over the elastomer sheet,
  a conditioned air entrance conduit for directing conditioned air through the spring means,
a backrest includes,
  a foam base,
  spring means,
  metal mesh covering the spring means, an elastomer sheet over the metal mesh, a conditioned air entrance conduit for directing air through the spring means;
a headrest having a hollow interior and a flexible connection hose interconnecting the headrest interior with the backrest spring means;
a thermoelectric air conditioning unit having an ambient air input and a conditioned air output; and
a proportioning valve interconnecting the air conditioning unit output and the entrance conduits for the seat and backrest.

20. A seating construction as in claim 19, in which the spring means consists of a plurality of coil springs arranged to receive forces applied to the seating construction along directions generally parallel to the planes of the coil springs.

21. A seating construction as in claim 8, in which the spring means consists of a plurality of hollow tubular molded synthetic plastic elements the walls of which contain openings, and the synthetic plastic being flexible.

* * * * *